US012594820B2

(12) United States Patent
Chang et al.

(10) Patent No.: US 12,594,820 B2
(45) Date of Patent: Apr. 7, 2026

(54) VEHICLE BODY ROOF STRUCTURE

(71) Applicants:Hyundai Motor Company, Seoul
(KR); Kia Corporation, Seoul (KR)

(72) Inventors: Ji Won Chang, Seoul (KR); **Yujeong
Kim, Yongin-si (KR); Inbum Lee**,
Seoul (KR); Sunki Choi, Hwaseong-si
(KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 314 days.

(21) Appl. No.: 18/451,483

(22) Filed: Aug. 17, 2023

(65) Prior Publication Data

US 2024/0190223 A1     Jun. 13, 2024

(30) Foreign Application Priority Data

Dec. 13, 2022     (KR) ........................ 10-2022-0173932

(51) Int. Cl.
*B60J 7/043* (2006.01)
(52) U.S. Cl.
CPC .................................... *B60J 7/043* (2013.01)

(58) Field of Classification Search
CPC ..... B60J 7/11; B60J 7/043; B60J 7/192; B60J
7/04; B60J 7/022; B60J 7/024; B60J
7/053; B60J 7/185; B60J 7/19; B60J
7/194
USPC .................................... 296/216.01, 4, 8, 222
See application file for complete search history.

(56) References Cited

U.S. PATENT DOCUMENTS

| | | | | |
|---|---|---|---|---|
| 2,661,234 | A * | 12/1953 | William | B60J 7/192 |
| | | | | 296/213 |
| 7,914,072 | B2 * | 3/2011 | Queener | B62D 25/06 |
| | | | | 296/210 |
| 2013/0161982 | A1 * | 6/2013 | Walter | B60J 7/0435 |
| | | | | 296/217 |

* cited by examiner

*Primary Examiner* — Dennis H Pedder
(74) *Attorney, Agent, or Firm* — Slater Matsil, LLP

(57) ABSTRACT

An embodiment roof structure for a vehicle body includes a
roof side body disposed on both sides of the vehicle body
and including a side closed section along a length direction
of the vehicle body, a roof ring assembly mounted inside the
roof side body and including a reinforcement closed section
adjacent to the side closed section along the length direction
of the vehicle body, a moving guide portion mounted to the
roof ring assembly, and a moving roof detachably mounted
on the roof ring assembly and configured to be slidable along
the moving guide portion.

18 Claims, 16 Drawing Sheets

VEHICLE BODY ROOF STRUCTURE

CROSS-REFERENCE TO RELATED APPLICATIONS

This application claims the benefit of Korean Patent Application No. 10-2022-0173932, filed on Dec. 13, 2022, which application is hereby incorporated herein by reference.

TECHNICAL FIELD

The present invention relates to a vehicle body roof structure.

BACKGROUND

A sunroof module mounted on the roof of a vehicle requires a plurality of parts such as glass, motor, wiring, and frame, and the structure is complex.

In addition, the sunroof can only tilt, or the open feeling is limited because the part that is not open is relatively large.

In addition, the strength or rigidity of the vehicle body according to the opening of the sunroof is insufficient, so that the crash (roof crush) or NVH (booming) performance is weak, and accordingly, separate reinforcement is required.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body roof structure. Particular embodiments relate to a vehicle body roof structure capable of sliding and detaching roofs.

Embodiments of the present invention provide a vehicle body roof structure capable of securing the strength and stiffness of a vehicle body with a simple configuration.

In addition, embodiments of the present invention provide a vehicle body roof structure capable of sliding and detaching the roof with a simple configuration.

A vehicle body roof structure according to an exemplary embodiment of the present invention may include a roof side body of which a side closed section is formed along the length direction of a vehicle body disposed on both sides of the vehicle body respectively, a roof ring assembly mounted inside the roof side body, of which a reinforcement closed section is formed adjacent to the side closed section along the length direction of the vehicle body, and the roof ring assembly of which a moving guide portion is mounted thereto, and a moving roof which is slidable along the moving guide portion and is detachably mounted on the roof ring assembly.

The moving guide portion may include side rails mounted on both sides of the vehicle body along the length direction of the vehicle body to the roof ring assembly. And the roof ring assembly may include a ring assembly upper panel on which the side rail is mounted.

The ring assembly upper panel may include an upper panel outer flange connected to the roof side body, an upper panel outer rail mount surface on which the side rail is mounted, and an upper panel bottom surface curved on the upper panel rail mount surface.

The ring assembly upper panel may include an upper panel bend portion bent from the upper panel bottom surface. And the vehicle body roof structure may further include a roof sealing weather strip mounted on the upper panel bend portion.

The roof ring assembly may further include a ring assembly lower panel forming the reinforcement closed section together with the ring assembly upper panel.

A bearing guide slot may be formed on the ring assembly lower panel at a position corresponding to the side rail.

The roof ring assembly lower panel may include a lower panel outer flange connected to the roof side body, a lower panel center portion formed with the bearing guide slot, and a lower panel inner flange connected to the upper panel bottom surface.

The moving guide portion may include an outer sliding link disposed on both sides of the vehicle body respectively, and a side rail bearing connected to the outside of each of the outer sliding links and movably mounted along each of the side rails.

The moving guide portion may further include an outer detachable guide rail mounted inside each of the outer sliding links. And the moving roof may include a roof panel, a roof sliding link mounted below the roof panel, and an outer detachable bearing mounted on the outside of the roof sliding link and movably inserted into the outer detachable guide rail respectively.

The vehicle body roof structure according to an exemplary embodiment of the present invention may further include a rail rotation pin for rotatably mounting at least one of the outer detachable guide rails of the outer detachable guide rails on both sides to the outer sliding link and a rotation lever connected to the outer detachable guide rail.

The roof ring assembly may include a ring assembly side portion provided on both sides of the vehicle body along the roof side body and a ring assembly center portion formed inside the ring assembly side portion along the vehicle body length direction.

The moving guide portion may include a side rail mounted on both sides of the vehicle body along the length direction of the vehicle body on the ring assembly side portion and two center rails mounted on the ring assembly center portion along the length direction of the vehicle body.

The roof ring assembly may include a ring assembly upper panel on which the side rails and the center rails are mounted.

The ring assembly upper panel may include an upper panel outer flange coupled to each of the roof side body, an upper panel outer rail mount surface on which the side rails are mounted, an upper panel center rail mount surface on which the center rails are mounted, and an upper panel bottom surface curved on the upper panel outer rail mount surface and the upper panel center rail mount surface.

The roof ring assembly may further include a ring assembly lower panel formed with a bearing guide slot at a position corresponding to the side rail and forming the reinforcement closed section together with the ring assembly upper panel.

The moving guide portion may include an outer sliding link disposed on both sides of the vehicle body, respectively, a side rail bearing connected to the outside of each of the outer sliding links and movably mounted along each of the side rails, two inner sliding links disposed inside the vehicle body, and a center rail bearing connected to the inside of each of the inner sliding links and movably mounted along each of the center rails.

The moving guide portion may include an outer detachable guide rail mounted inside each of the outer sliding links and an inner detachable guide rail mounted on the outside of each inner sliding link. And the moving roof may further include two roof panels, a roof sliding link mounted below each of the roof panels, an outer detachable bearing mounted on the outside of each roof sliding link and movably inserted into the outer detachable guide rail, and an inner detachable bearing mounted inside each of the roof sliding links and movably inserted into the inner detachable guide rail.

The vehicle body roof structure according to an exemplary embodiment of the present invention may further include a rail rotation pin rotatably mounting at least one detachable guide rail of both outer detachable guide rails to the outer sliding link and a rotation lever connected to the outer detachable guide rail.

The vehicle body roof structure according to an exemplary embodiment of the present invention may further include a safety pad mounted on the lower part of the moving roof.

The vehicle body roof structure according to an exemplary embodiment of the present invention may further include a stopper pin mounted on the moving roof and a closing stopper hole and an opening stopper hole formed on the roof of the vehicle body so that the stopper pin is selectively inserted.

According to the vehicle body roof structure according to an exemplary embodiment of the present invention, it is possible to provide a vehicle body roof structure capable of securing the rigidity and strength of the vehicle body with a simple configuration.

According to the vehicle body roof structure according to an embodiment of the present invention, it is possible to provide a vehicle body roof structure capable of sliding and detaching a sunroof with a simple configuration.

In addition, effects that can be obtained or predicted by an exemplary embodiment of the present invention will be directly or implicitly disclosed in the detailed description of an exemplary embodiment of the present invention. That is, various effects predicted according to an exemplary embodiment of the present invention will be disclosed within a detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

Figure 1:
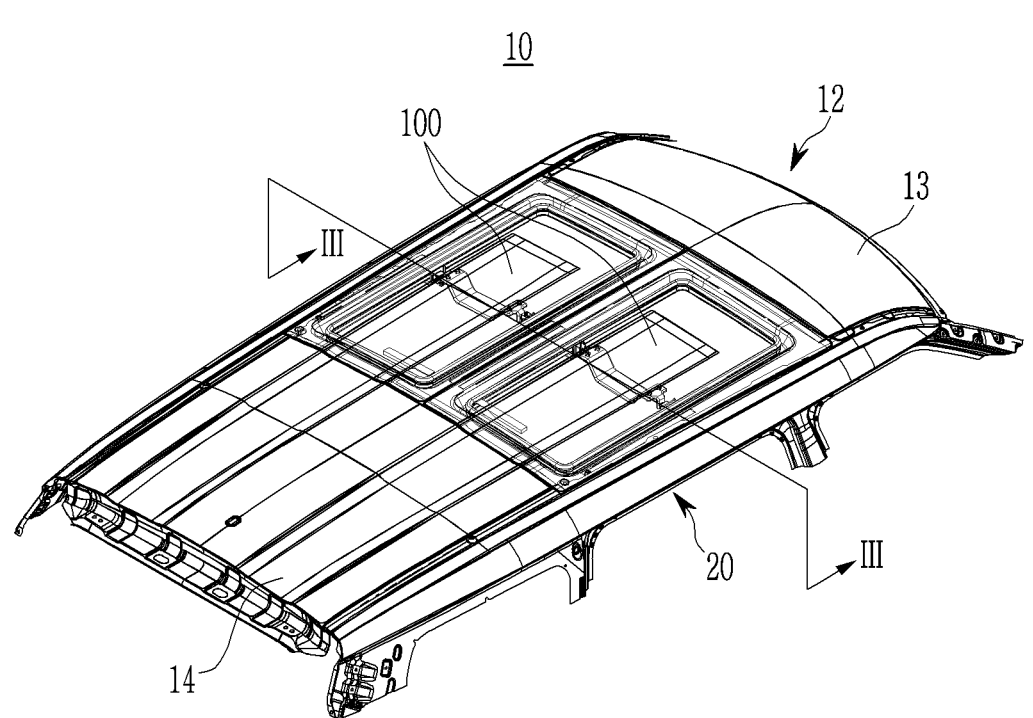
FIG. 1 is a perspective view of a vehicle body roof structure according to an exemplary embodiment of the present invention.

The following reference identifiers may be used in connection with the drawings to describe features of exemplary embodiments of the present invention.

| | |
|---|---|
| 10: vehicle body | 12: roof assembly |
| 13: front roof | 14: rear roof |
| 20: roof side body | 22: side outer panel |
| 23: panel bend portion | 24: side inner panel |
| 26: side closed section | 30: roof ring assembly |
| 32: reinforcement closed section | 34: ring assembly side portion |
| 36: ring assembly center portion | 40: ring assembly upper panel |
| 42: upper panel outer flange | 44: upper panel outer rail mount surface |
| 45: upper panel center rail mount surface | 48, 49: upper panel bend portion |
| 46, 47: upper panel bottom surface | 62: bearing guide slot |
| 60: ring assembly lower panel | 66: lower panel center portion |
| 64: lower panel outer flange | 80: moving guide portion |
| 68: lower panel inner flange | 84: outer sliding link |
| 82: side rail | 88: outer detachable guide rail |
| 86: side rail bearing | 92: inner sliding link |
| 90: center rail | 96: inner detachable guide rail |
| 94: center rail bearing | 102: roof panel |
| 100: moving roof | 106: roof lower panel |
| 104: roof upper panel | 110: roof sliding link |
| 108: hemming portion | 124: rail rotation pin |

-continued

| 112: outer detachable bearing | 128: inner detachable bearing |
|---|---|
| 126: rotation lever | 132: safety pad |
| 130: roof sealing weather strip | 136: closing stopper hole |
| 134: stopper pin | |
| 138: opening stopper hole | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of description, the embodiments of the present invention are not necessarily limited to those shown in the drawings, and the thickness is enlarged to clearly express various parts and regions.

Throughout the specification, when a part includes a certain component, this means that it may further include other components without excluding other components unless otherwise stated.

In addition, terms such as "part" and "means" described in the specification mean a comprehensive unit of configuration that performs at least one function or operation.

When a part such as a layer, film, region, plate, etc. is said to be "on" another part, this includes not only the case of being directly on the other part, but also the case where there is another part in between.

In contrast, when an element is referred to as being "directly on" another element, there are no intervening elements present.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (purpose built vehicles), hydrogen-powered vehicles, and other alternative fuel vehicles (e.g., other than petroleum fuel derived from resources).

Exemplary embodiments of the present invention will hereinafter be described in detail with reference to the accompanying drawings.

Figure 2:
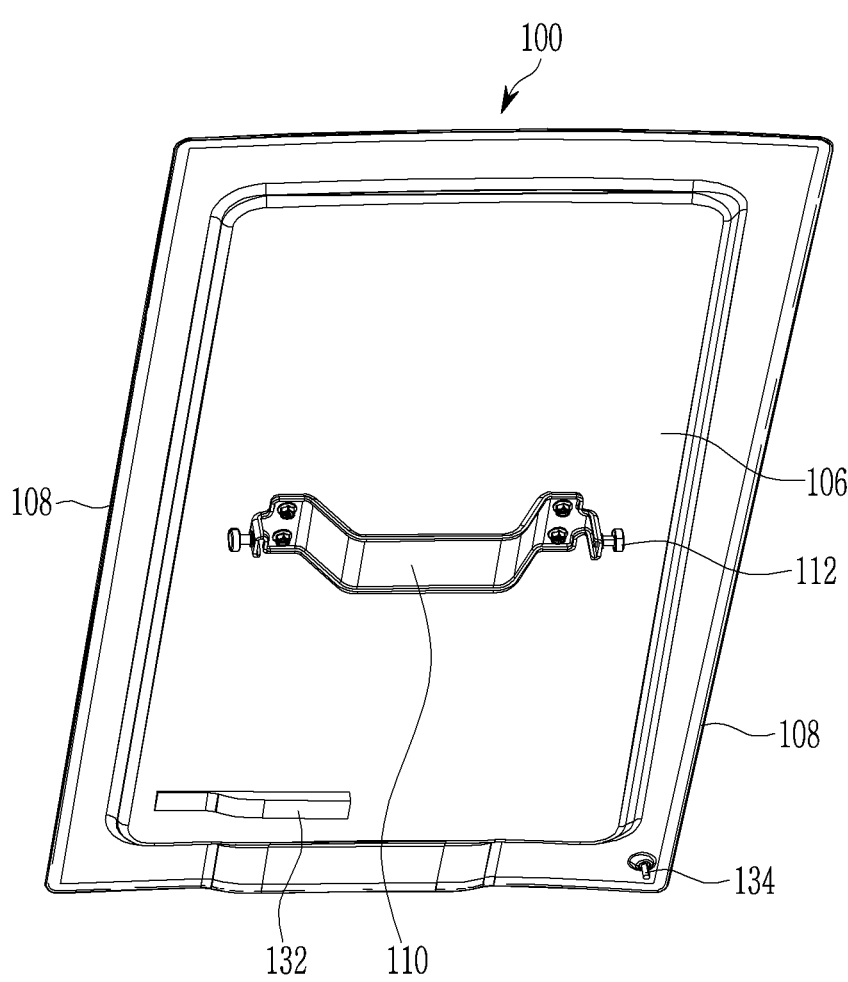
FIG. 2 is a perspective view of a moving roof of the vehicle body roof structure according to an exemplary embodiment of the present invention.

FIG. 1 is a perspective view of a vehicle body roof structure according to an exemplary embodiment of the present invention, and FIG. 2 is a perspective view of a moving roof of the vehicle body roof structure according to an exemplary embodiment of the present invention.

Figure 3:
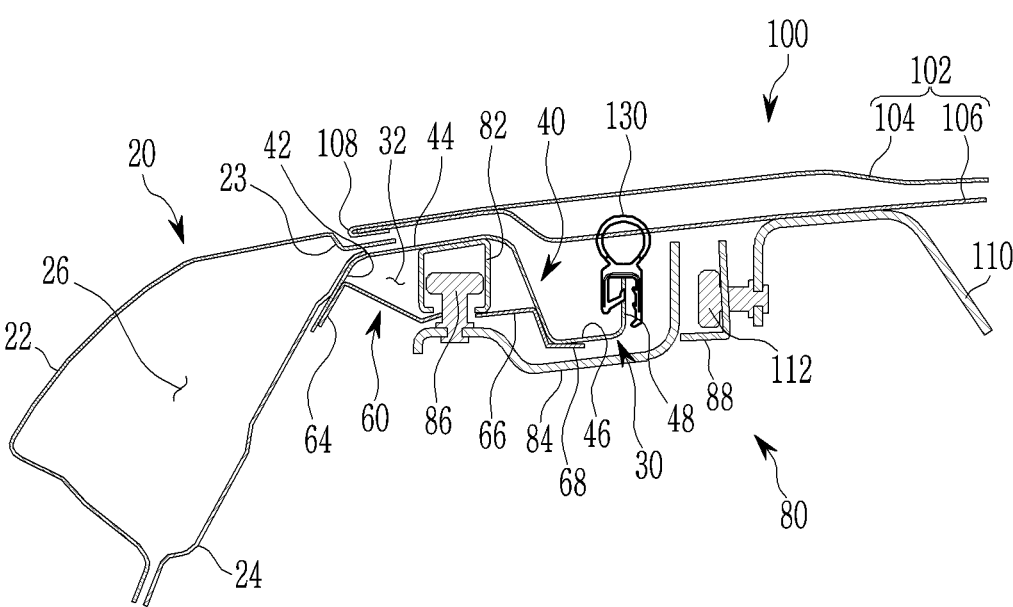
FIG. 3 is a partial cross-sectional view along line III-III in FIG. 1.
Figure 4:
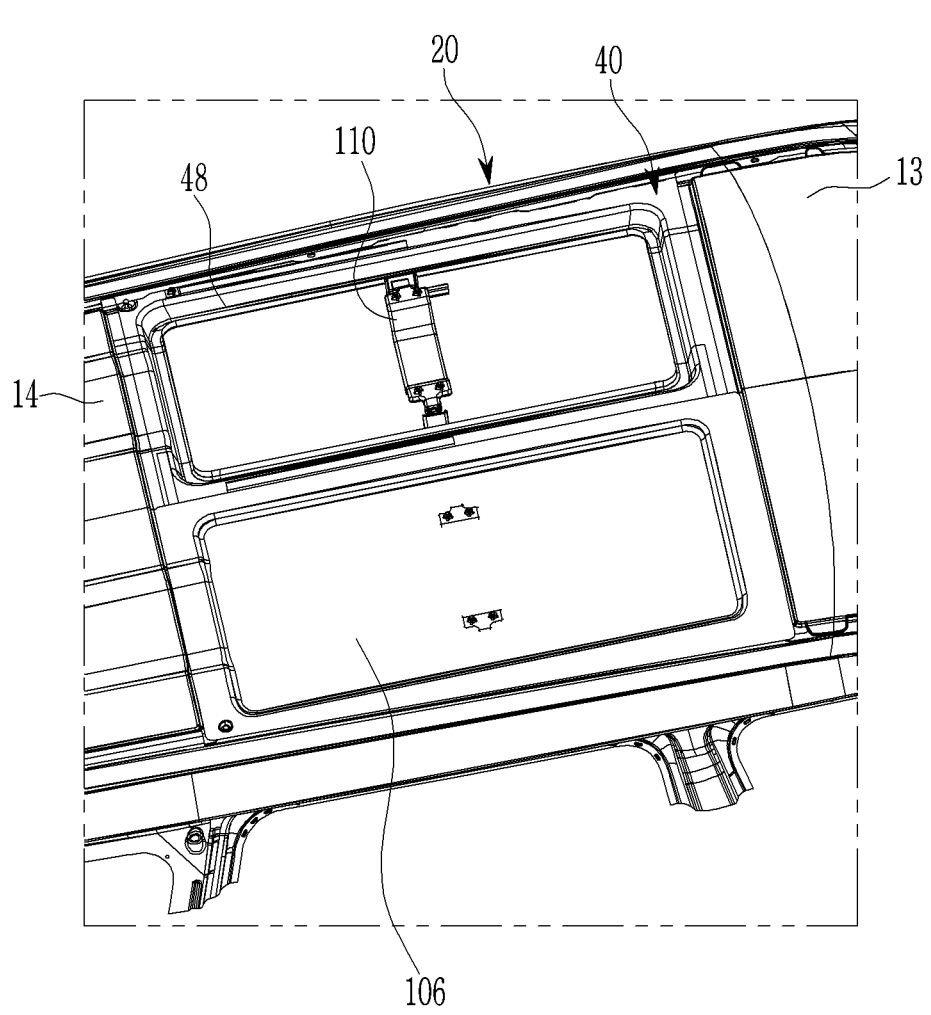
FIG. 4 to FIG. 6 are partial perspective views of the vehicle body roof structure according to an exemplary embodiment of the present invention.

FIG. 3 is a partial cross-sectional view along line III-III in FIG. 1, and FIG. 4 to FIG. 6 are partial perspective views of the vehicle body roof structure according to an exemplary embodiment of the present invention.

Referring to FIG. 1, a vehicle body 10 to which a vehicle body roof structure according to an exemplary embodiment of the present invention may be applied includes a roof assembly 12, and the roof assembly 12 includes a front roof 13 disposed at the front of the vehicle body 10 and a rear roof 14 disposed at the rear of the vehicle body 10.

Between the front roof 13 and the rear roof 14, a sliding and detachable moving roof 100 may be disposed.

Referring to FIG. 2, a roof sliding link 110 is mounted on the lower portion of the moving roof 100.

The occupant may manually move the roof sliding link 110 to slide or detach the moving roof 100 with respect to the vehicle body 10.

In addition, a stopper pin 134 to be described below may be mounted on the lower portion of the moving roof 100.

Although the drawing shows two of the moving roofs 100 mounted, the embodiments are not limited thereto, and one moving roof capable of sliding and detaching may be mounted.

Referring to FIG. 1 to FIG. 6, the vehicle body roof structure according to an exemplary embodiment of the present invention includes a roof side body 20 of which a side closed section 26 is formed along the length direction of the vehicle body 10 disposed on both sides of the vehicle body 10, respectively, a roof ring assembly 30 mounted inside the roof side body 20, of which a reinforcement closed section 32 is formed adjacent to the side closed section 26 along the length direction of the vehicle body 10, and the roof ring assembly 30 of which a moving guide portion 80 is mounted thereto, and the moving roof 100 which is slidable along the moving guide portion 80 and is detachably mounted on the roof ring assembly 30.

As shown in FIG. 2 and FIG. 3, the moving roof 100 may include a roof panel 102 formed of a roof upper panel 104 and a roof lower panel 106 connected with the roof upper panel 104.

A hemming portion 108 is formed at an end of the roof upper panel 104 to cover an end of the roof lower panel 106.

The ends of the roof upper panel 104 and the roof lower panel 106 are coupled through the hemming portion 108, so that a separate hemming process for sealing the moving roof 100 may be omitted.

The roof side body 20 may include a side outer panel 22 and a side inner panel 24 forming the side closed section 26 together with the side outer panel 22.

A panel bend portion 23 on which the hemming portion 108 is seated may be formed at upper ends of the side outer panel 22 and the side inner panel 24.

The panel bend portion 23 may strengthen the upper strength of the roof side body 20 by its curved shape and may seat the moving roof 100 thereon.

Figure 7:
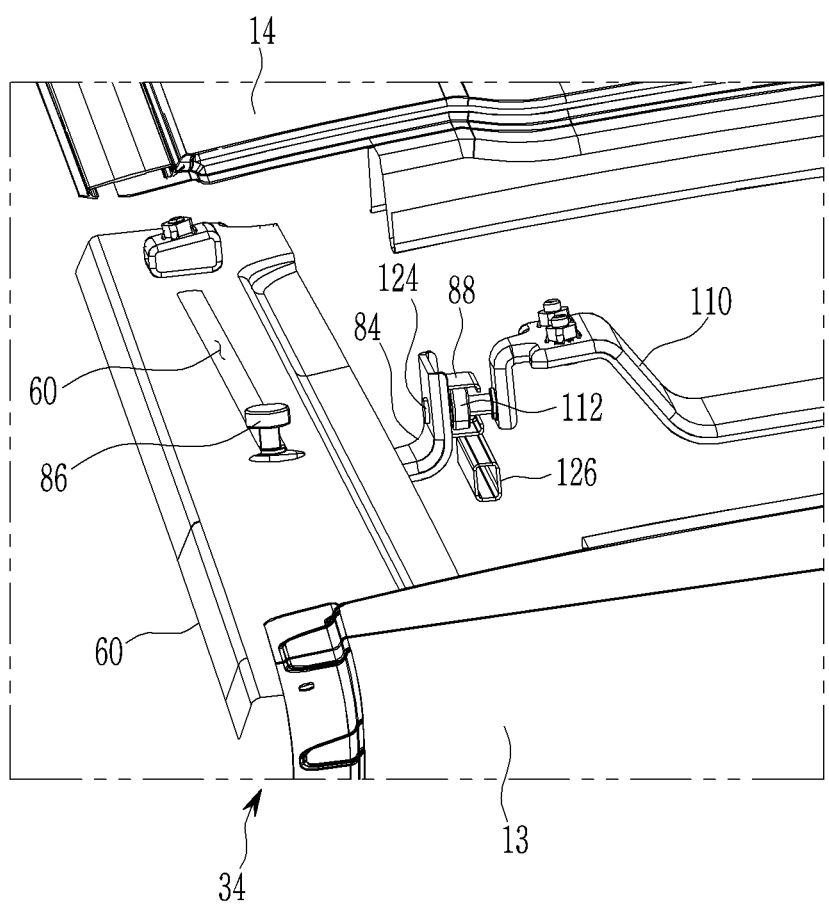
FIG. 7 is a partial perspective view of a lower panel of a ring assembly of the vehicle body roof structure according to an exemplary embodiment of the present invention.
Figure 8:
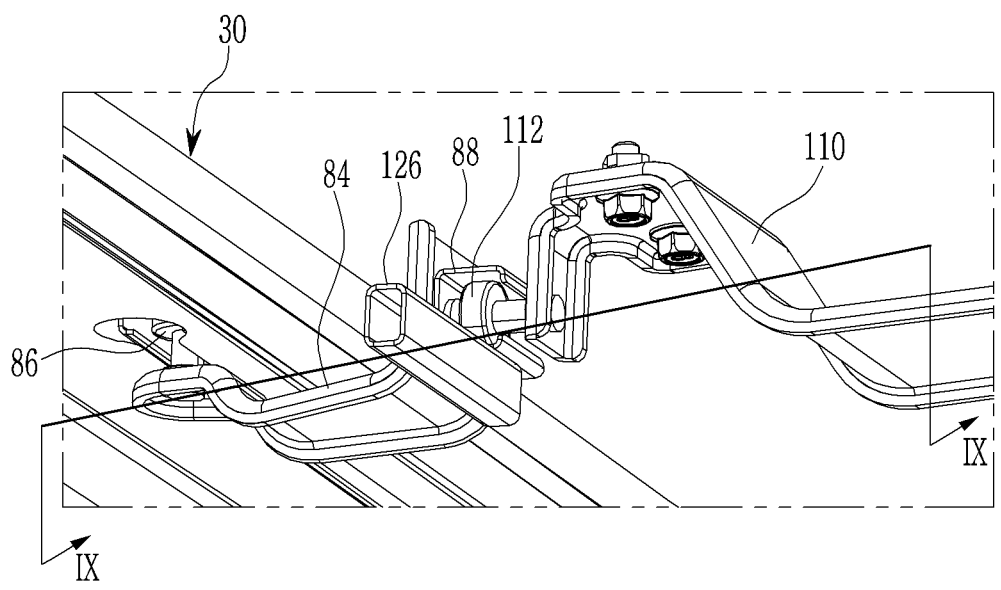
FIG. 8 is a perspective view of an outer sliding link of the vehicle body roof structure according to an exemplary embodiment of the present invention.
Figure 9:
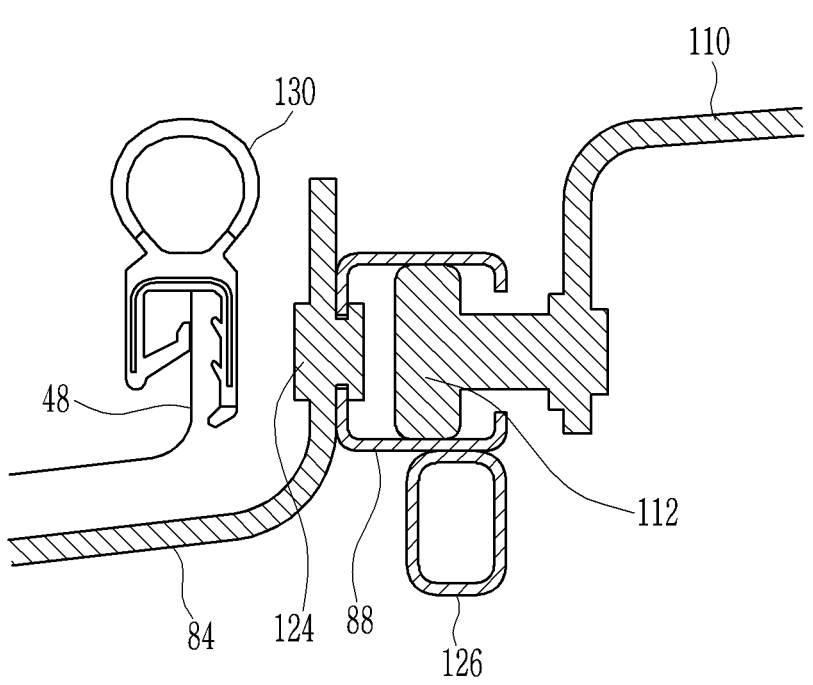
FIG. 9 is a partial cross-sectional view along the line IX-IX in FIG. 8.

FIG. 7 is a partial perspective view of a lower panel of a ring assembly of the vehicle body roof structure according to an exemplary embodiment of the present invention, FIG. 8 is a perspective view of an outer sliding link of the vehicle body roof structure according to an exemplary embodiment of the present invention, and FIG. 9 is a partial cross-sectional view along the line IX-IX in FIG. 8.

Referring to FIG. 1 to FIG. 9, the moving guide portion 80 includes side rails 82 mounted to the roof ring assembly 30 on both sides of the vehicle body 10 along the length direction of the vehicle body 10, and the roof ring assembly 30 includes a ring assembly upper panel 40 on which the side rail 82 is mounted.

The ring assembly upper panel 40 includes an upper panel outer flange 42 connected to the roof side body 20, an upper panel outer rail mount surface 44 on which the side rail 82 is mounted, and an upper panel bottom surface 46 curved on the upper panel outer rail mount surface 44.

The ring assembly upper panel 40 is formed in a substantially inverted "U" shape to reinforce the lateral direction strength of the vehicle body 10.

The ring assembly upper panel 40 further includes an upper panel bend portion 48 bent from the upper panel bottom surface 46.

The vehicle body roof structure according to an exemplary embodiment of the present invention may further include a roof sealing weather strip 130 mounted on the upper panel bend portion 48.

The roof sealing weather strip 130 has a sealing function to block the inflow of external material between the upper panel bend portion 48 and the moving roof 100 and may support the moving roof 100 with elasticity.

For example, the roof sealing weather strip 130 may be formed of an elastic material such as rubber or silicon.

The roof ring assembly 30 may further include a ring assembly lower panel 60 forming the reinforcement closed section 32 together with the ring assembly upper panel 40.

The reinforcement closed section 32 is formed inside the side closed section 26 to reinforce the side direction strength of the vehicle body 10.

That is, the reinforcement closed section 32 and the side closed section 26 form a double closed section, so that the side direction strength of the vehicle body 10 may be strengthened.

A bearing guide slot 62 may be formed on the ring assembly lower panel 60 at a position corresponding to the side rail 82.

A side rail bearing 86 may be inserted into the side rail 82 to be movable along the side rail 82.

The ring assembly lower panel 60 includes a lower panel outer flange 64 connected to the roof side body 20, a lower panel center portion 66 formed with the bearing guide slot 62, and a lower panel inner flange 68 connected to the upper panel bottom surface 46.

The side rail bearing 86 inserted into the side rail 82 may be moved along the bearing guide slot 62.

The moving guide portion 80 may further include an outer sliding link 84 disposed on both sides of the vehicle body 10, respectively, and the side rail bearing 86 connected to the outer side of each outer sliding link 84.

When the side rail bearing 86 moves along the side rail 82, the moving roof 100 moves relative to the roof assembly 12.

The moving guide portion 80 further includes an outer detachable guide rail 88 mounted inside each of the outer sliding links 84.

The moving roof 100 includes the roof sliding link 110 mounted below the roof panel 102 and an outer detachable bearing 112 mounted on the outside of the roof sliding link 110 and movably inserted into the outer detachable guide rail 88 respectively.

The vehicle body roof structure according to an exemplary embodiment of the present invention includes a rail rotation pin 124 for rotatably mounting at least one of the outer detachable guide rails 88 of the outer detachable guide rails 88 on both sides to the outer sliding link 84 and a rotation lever 126 connected to the outer detachable guide rail 88.

The formation direction of the side rail 82 and the outer detachable guide rail 88 is shown as being formed in the length direction of the vehicle body 10 in FIG. 8, but the outer detachable guide rail 88 may be rotated based on the outer sliding link 84. And when the outer detachable guide rail 88 is rotated, the outer detachable bearing 112 may move in the height direction of the vehicle body 10, so that the moving roof 100 may be separated from the vehicle body 10.

The operation will be described later.

The vehicle body roof structure according to an exemplary embodiment of the present invention has been described assuming that one moving roof 100 is installed, but the embodiments are not limited thereto, and two moving roofs 100 may be installed, which will be described referring to the drawings.

As shown in FIG. 1, the vehicle body roof structure according to an exemplary embodiment of the present invention may include two moving roofs 100 installed on the left and right sides of the vehicle body 10 respectively, and each moving roof 100 may be independently slid and detached from the vehicle body 10.

Figure 5:
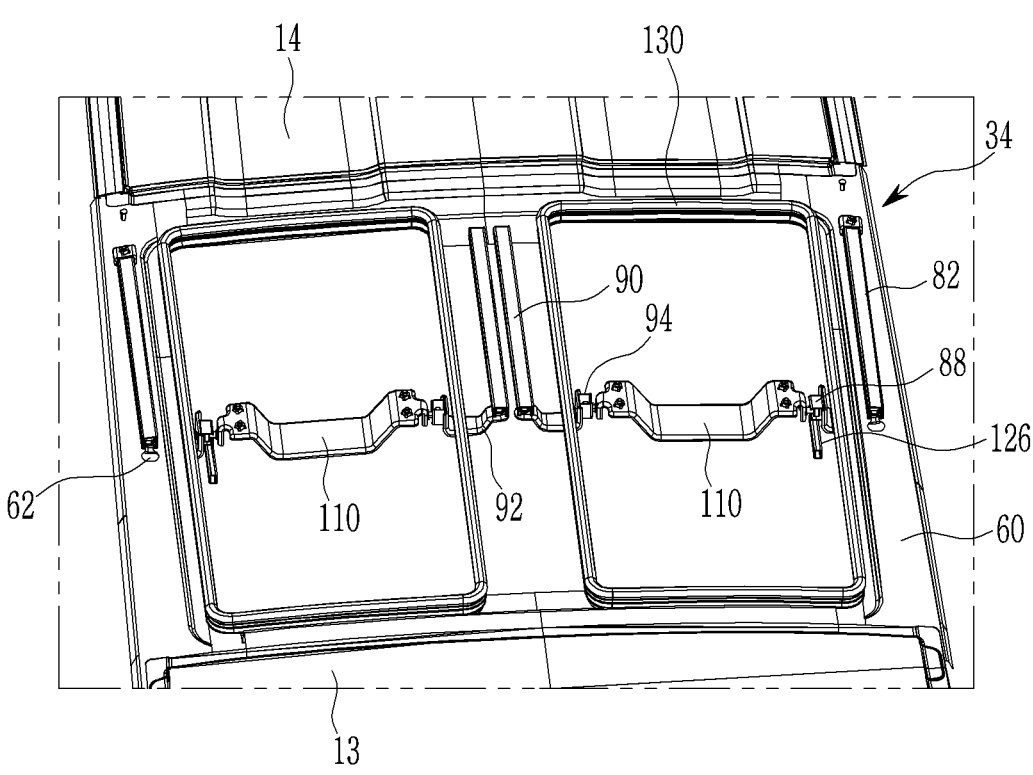
Figure 6:
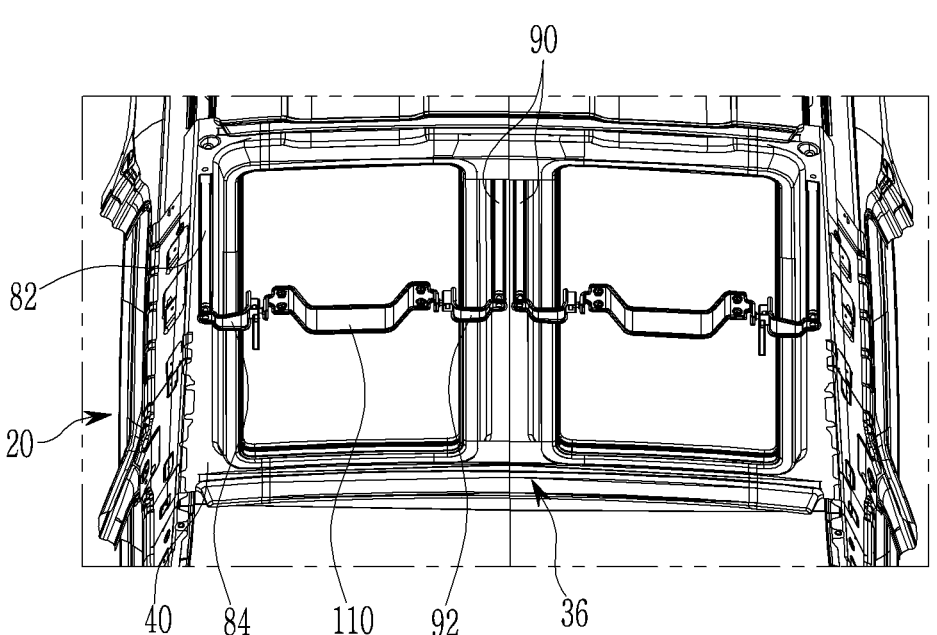

Referring to FIG. 5 and FIG. 6, the roof ring assembly 30 includes a ring assembly side portion 34 provided on both sides of the vehicle body 10 along the roof side body 20 and a ring assembly center portion 36 formed inside the ring assembly side portion 34 along the vehicle body 10 length direction.

The moving guide portion 80 may include the side rails 82 mounted on both sides of the vehicle body 10 along the length direction of the vehicle body 10 on the ring assembly side portion 34 and two center rails 90 mounted on the ring assembly center portion 36 along the length direction of the vehicle body 10.

Figure 10:
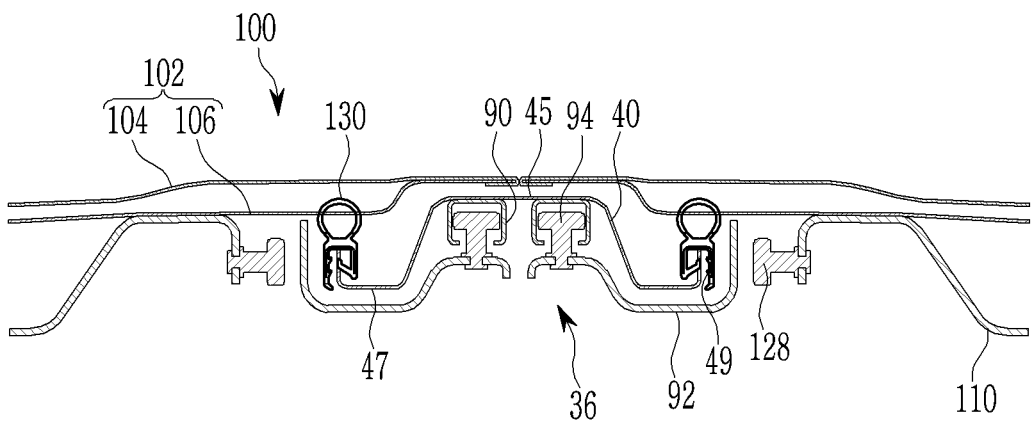
FIG. 10 is another partial cross-sectional view along line III-III in FIG. 1.
Figure 11:
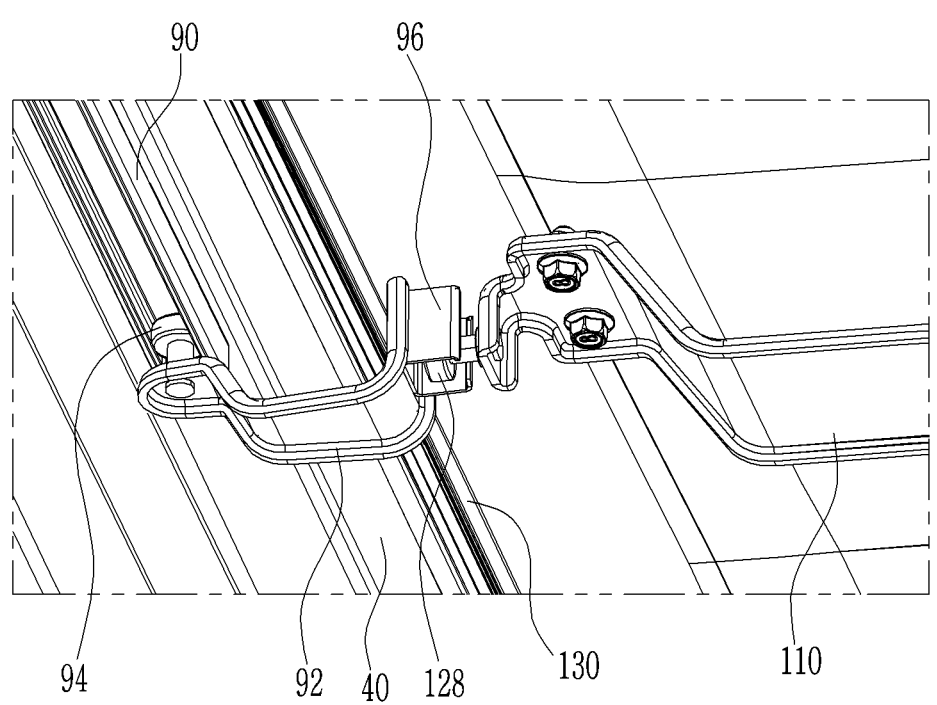
FIG. 11 is a perspective view from an inside of an inner sliding link of the vehicle body roof structure according to an exemplary embodiment of the present invention.

FIG. 10 is another partial cross-sectional view along line III-III in FIG. 1, and FIG. 11 is a perspective view from an inside of an inner sliding link of the vehicle body roof structure according to an exemplary embodiment of the present invention.

Figure 12:
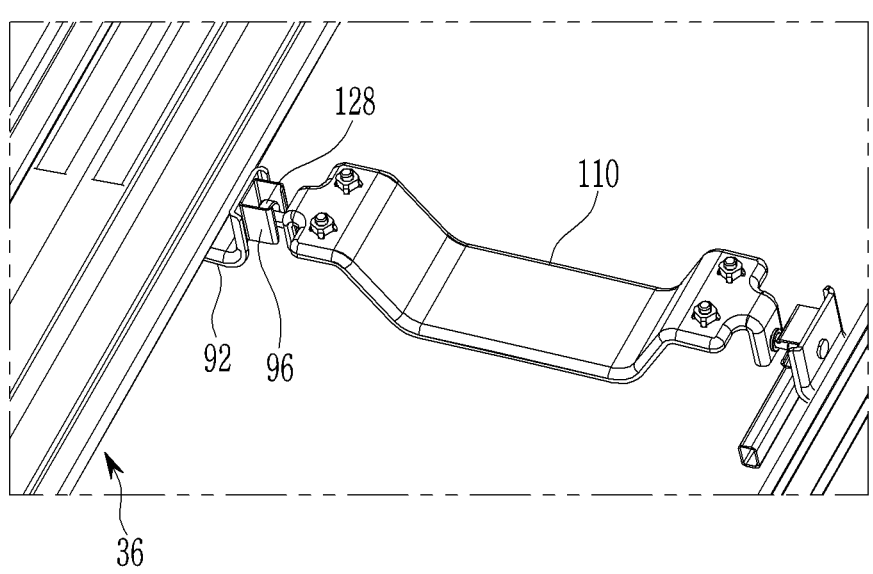
FIG. 12 is a perspective view from an outside of the inner sliding link of the vehicle body roof structure according to an exemplary embodiment of the present invention.

FIG. 12 is a perspective view from an outside of the inner sliding link of the vehicle body roof structure according to an exemplary embodiment of the present invention.

Referring to FIG. 3 and FIG. 10, the roof ring assembly 30 may include the ring assembly upper panel 40 on which the side rails 82 and the center rails 90 are mounted.

The ring assembly upper panel 40 may include the upper panel outer flange 42 coupled to each of the roof side body 20, the upper panel outer rail mount surface 44 on which the side rails 82 are mounted, an upper panel center rail mount surface 45 on which the center rails 90 are mounted, and the outer upper panel bottom surface 46 and an inner upper panel bottom surface 47 formed by bending at the upper panel outer rail mount surface 44 and the upper panel center rail mount surface 45, respectively.

An upper panel bend portion 49 is bent from the inner upper panel bottom surface 47, and the roof sealing weather strip 130 may also be mounted on the upper panel bend portion 49.

Referring to FIG. 10 to FIG. 12, the moving guide portion 80 may further include two inner sliding links 92 disposed inside the vehicle body 10 and a center rail bearing 94 connected inside each inner sliding link 92 and mounted movably along the center rail 90.

The moving guide portion 80 may further include an inner detachable guide rail 96 mounted outside each inner sliding link 92.

Referring to FIG. 1, FIG. 2, and FIG. 8 to FIG. 12, the moving roof 100 may further include the two roof panels 102, the roof sliding link 110 mounted on the lower part of each of the roof panels 102, the outer detachable bearing 112 mounted on the outside of each roof sliding link 110 and movably inserted into the outer detachable guide rail 88, and an inner detachable bearing 128 mounted on the inside of each roof sliding link 110 and movably inserted into the inner detachable guide rail 96.

The center rails 90 guide the movement of the moving roof 100 along the length direction of the vehicle body 10, and the outer detachable guide rail 88 and the inner detachable guide rail 96 guide the detachment of the moving roof 100.

Figure 13:
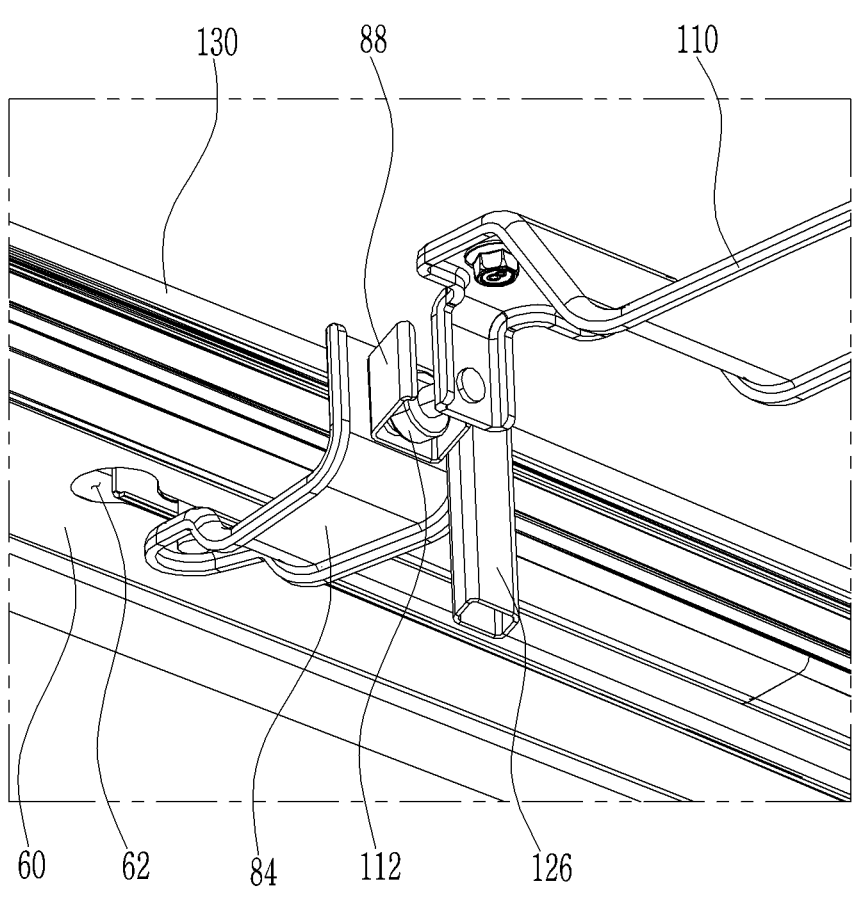
FIG. 13 is a perspective view showing an operation of the vehicle body roof structure according to an exemplary embodiment of the present invention.

FIG. 13 is a perspective view showing an operation of the vehicle body roof structure according to an exemplary embodiment of the present invention.

Referring to FIG. 3, FIG. 8, FIG. 9, FIG. 10, and FIG. 13, in a state in which the outer detachable guide rail 88 is rotated in the length direction of the vehicle body 10, the sliding of the moving roof 100 is limited in a state where the roof sealing weather strip 130 is pressed by the moving roof 100.

Figure 14:
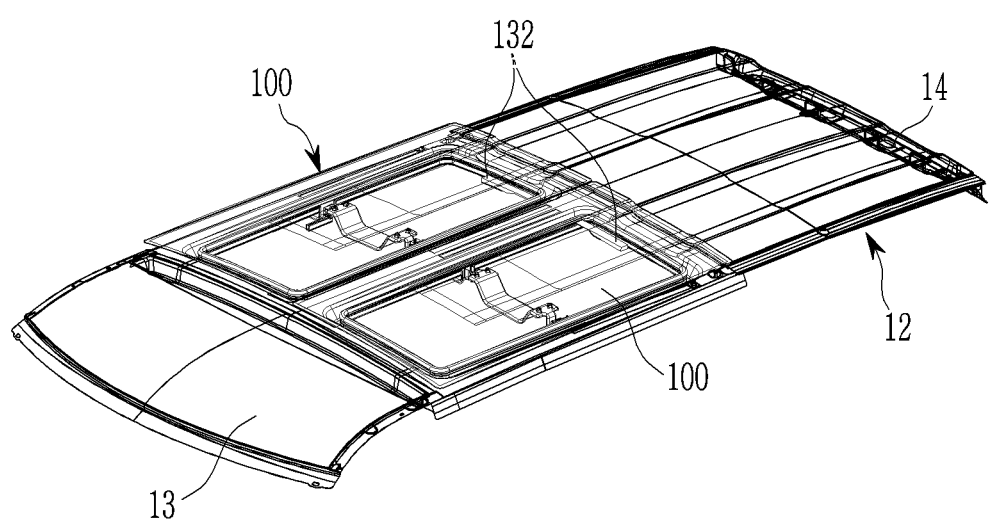
FIG. 14 and FIG. 15 are perspective views showing a sliding operation of the vehicle body roof structure according to an exemplary embodiment of the present invention.
Figure 15:
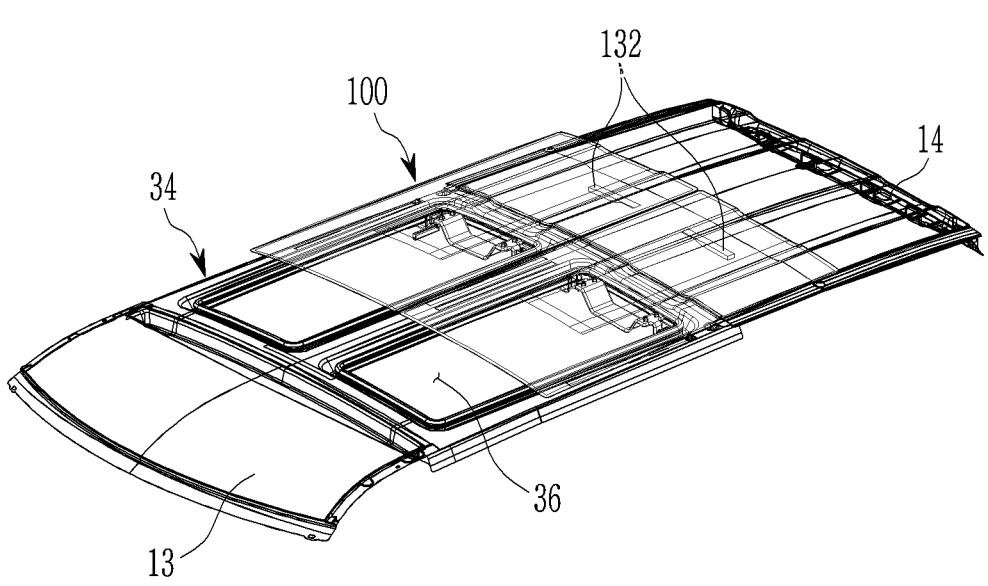
Figure 16:
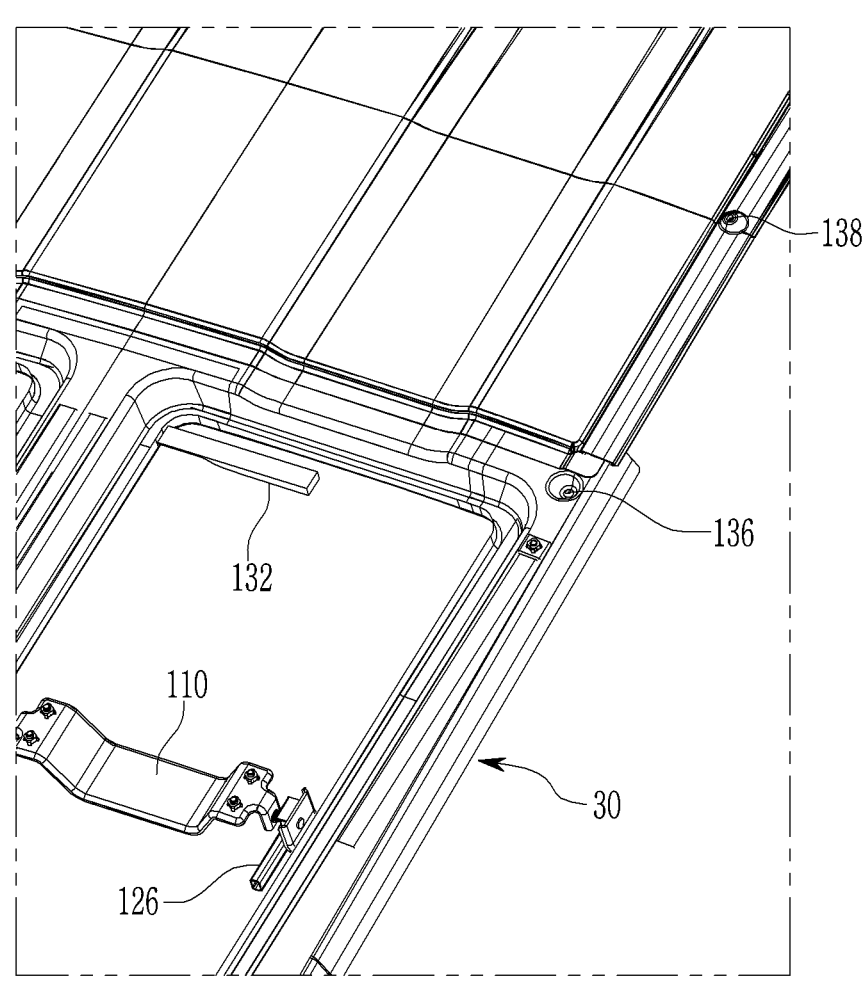
FIG. 16 is a perspective view showing a stopper hole of the vehicle body roof structure according to an exemplary embodiment of the present invention.

FIG. 14 and FIG. 15 are perspective views showing a sliding operation of the vehicle body roof structure according to an exemplary embodiment of the present invention.

As shown in FIG. 13, when the outer detachable guide rail 88 is rotated using the rotation lever 126, the moving roof 100 may be moved up and down.

In other words, according to the rotation of the outer detachable guide rail 88, as shown in FIG. 14, the moving roof 100 may be slightly lifted upward by the elastic force of the roof sealing weather strip 130, and in this state, when a vehicle occupant moves the roof sliding link 110, the moving roof 100 moves as shown in FIG. 15. That is, it may move in the length direction of the vehicle body 10.

After moving the moving roof 100, as shown in FIG. 8 and FIG. 9, when the rotation lever 126 is rotated again, the moving roof 100 moves in the downward direction, and the roof sealing weather strip 130 is pressed by the moving roof 100, limiting the sliding of the moving roof 100.

Also, as shown in FIG. 13, when the outer detachable guide rail 88 is rotated using the rotation lever 126, the outer detachable bearing 112 may be moved up and down on the outer detachable guide rail 88, and the inner detachable bearing 128 may move up and down on the inner detachable guide rail 96.

Accordingly, since the moving roof 100 may move up and down, it is also possible to separate the moving roof 100 from the vehicle body 10.

When the moving roof 100 is separated from the vehicle body 10, the sense of openness is further increased, and it is also possible to insert or move cargo through the space where the moving roof 100 is removed.

The vehicle body roof structure according to an exemplary embodiment of the present invention may further include a safety pad 132 mounted on the lower part of the moving roof 100.

The safety pad 132 may prevent scratches on the roof assembly 12 when moving the moving roof 100 or fixing the moving roof 100.

The vehicle body roof structure according to an exemplary embodiment of the present invention may further include the stopper pin 134 mounted on the moving roof 100 and a closing stopper hole 136 and an opening stopper hole 138 formed on the roof of the vehicle body 10, for example, the rear roof 14, so that the stopper pin 134 is selectively inserted.

When the moving roof 100 is closed, the stopper pin 134 is inserted into the closing stopper hole 136 to fix the moving roof 100, and after the moving roof 100 moves, for example, after the moving roof 100 moves to the rear of the vehicle body 10, the stopper pin 134 may be inserted into the opening stopper hole 138 to fix the moving roof 100.

As described above, according to the vehicle body roof structure according to an exemplary embodiment of the present invention, the rigidity and strength of the vehicle body may be secured with a simple configuration.

In addition, according to the vehicle body roof structure according to an exemplary embodiment of the present invention, the roof may be slidable and detachable with a simple configuration.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A roof structure for a vehicle body, the roof structure comprising:
   a roof side body disposed on both sides of the vehicle body and comprising a side closed section along a length direction of the vehicle body;
   a roof ring assembly mounted inside the roof side body and comprising a reinforcement closed section adjacent to the side closed section along the length direction of the vehicle body;
   a moving guide portion mounted to the roof ring assembly, wherein the moving guide portion comprises a side rail mounted to the roof ring assembly on both sides of the vehicle body along the length direction of the vehicle body and wherein the roof ring assembly comprises a ring assembly upper panel on which the side rail is mounted; and
   a moving roof detachably mounted on the roof ring assembly and configured to be slidable along the moving guide portion;
   wherein the ring assembly upper panel comprises:
      an upper panel outer flange connected to the roof side body;
      an upper panel outer rail mount surface on which the side rail is mounted; and
      an upper panel bottom surface curved on the upper panel outer rail mount surface.

2. The roof structure of claim 1, wherein:
   the ring assembly upper panel comprises an upper panel bend portion bent from the upper panel bottom surface; and
   the roof structure further comprises a roof sealing weather strip mounted on the upper panel bend portion.

3. The roof structure of claim 1, wherein the roof ring assembly further comprises a ring assembly lower panel defining the reinforcement closed section together with the ring assembly upper panel.

4. The roof structure of claim 3, further comprising a bearing guide slot on the ring assembly lower panel at a position corresponding to the side rail.

5. The roof structure of claim 4, wherein the ring assembly lower panel comprises:

a lower panel outer flange connected to the roof side body;

a lower panel center portion provided with the bearing guide slot; and a lower panel inner flange connected to the upper panel bottom surface.

6. The roof structure of claim 1, wherein the moving guide portion comprises:

an outer sliding link disposed on both sides of the vehicle body, respectively; and a side rail bearing connected to an outside of the outer sliding link and movably mounted along the side rail.

7. The roof structure of claim 6, wherein:

the moving guide portion further comprises an outer guide rail mounted inside the outer sliding link; and the moving roof comprises:

a roof panel;

a roof sliding link mounted below the roof panel; and an outer detachable bearing mounted on an outside of the roof sliding link and movably inserted into the outer guide rail.

8. The roof structure of claim 7, further comprising:

a rail rotation pin for rotatably mounting the outer guide rail to the outer sliding link; and a rotation lever connected to the outer guide rail.

9. The roof structure of claim 1, further comprising a safety pad mounted on a lower part of the moving roof.

10. The roof structure of claim 1, further comprising:

a stopper pin mounted on the moving roof; and a closing stopper hole and an opening stopper hole provided on a roof of the vehicle body and configured to selectively receive the stopper pin.

11. A roof structure for a vehicle body, the roof structure comprising:

a roof side body disposed on both sides of the vehicle body and comprising a side closed section along a length direction of the vehicle body;

a roof ring assembly mounted inside the roof side body and comprising:

a reinforcement closed section adjacent to the side closed section along the length direction of the vehicle body;

a ring assembly side portion disposed on both sides of the vehicle body along the roof side body; and a ring assembly center portion disposed inside the ring assembly side portion along the length direction of the vehicle body;

a moving guide portion mounted to the roof ring assembly; and a moving roof detachably mounted on the roof ring assembly and configured to be slidable along the moving guide portion;

wherein the moving guide portion comprises a side rail mounted on the ring assembly side portion on both sides of the vehicle body along the length direction of the vehicle body and two center rails mounted on the ring assembly center portion along the length direction of the vehicle body; and wherein the roof ring assembly comprises a ring assembly upper panel on which the side rail and the center rails are mounted; and wherein the ring assembly upper panel comprises:

an upper panel outer flange coupled to the roof side body;

an upper panel outer rail mount surface on which the side rail is mounted;

an upper panel center rail mount surface on which the center rails are mounted; and an upper panel bottom surface curved on the upper panel outer rail mount surface and the upper panel center rail mount surface.

12. The roof structure of claim 11, wherein the roof ring assembly further comprises a ring assembly lower panel provided with a bearing guide slot at a position corresponding to the side rail and defining the reinforcement closed section together with the ring assembly upper panel.

13. The roof structure of claim 11, wherein the moving guide portion comprises:

an outer sliding link disposed on both sides of the vehicle body, respectively;

a side rail bearing connected to an outside of the outer sliding link and movably mounted along the side rail;

two inner sliding links disposed inside the vehicle body; and a center rail bearing connected to an inside of each of the inner sliding links and movably mounted along each of the center rails.

14. The roof structure of claim 13, wherein:

the moving guide portion comprises:

an outer guide rail mounted inside the outer sliding link; and an inner guide rail mounted on an outside of the inner sliding links; and the moving roof further comprises:

two roof panels;

a roof sliding link mounted below each of the two roof panels;

an outer detachable bearing mounted on an outside of the roof sliding link and movably inserted into the outer guide rail; and an inner detachable bearing mounted inside the roof sliding link and movably inserted into the inner guide rail.

15. The roof structure of claim 14, further comprising:

a rail rotation pin rotatably mounting the outer guide rail to the outer sliding link; and a rotation lever connected to the outer guide rail.

16. A roof structure for a vehicle body, the roof structure comprising:

a roof side body disposed on both sides of the vehicle body and comprising a side closed section along a length direction of the vehicle body;

a roof ring assembly mounted inside the roof side body and comprising a reinforcement closed section adjacent to the side closed section along the length direction of the vehicle body;

a moving guide portion mounted to the roof ring assembly; and a moving roof detachably mounted on the roof ring assembly and configured to be slidable along the moving guide portion;

wherein the moving guide portion comprises a side rail mounted to the roof ring assembly on both sides of the vehicle body along the length direction of the vehicle body and the roof ring assembly comprises a ring assembly upper panel on which the side rail is mounted; and wherein the moving guide portion comprises an outer sliding link disposed on both sides of the vehicle body, respectively, and a side rail bearing connected to an outside of the outer sliding link and movably mounted along the side rail.

17. The roof structure of claim 16, wherein:

the moving guide portion further comprises an outer guide rail mounted inside the outer sliding link; and the moving roof comprises:

a roof panel;

a roof sliding link mounted below the roof panel; and an outer detachable bearing mounted on an outside of the roof sliding link and movably inserted into the outer guide rail.

18. The roof structure of claim 17, further comprising:

a rail rotation pin for rotatably mounting the outer guide rail to the outer sliding link; and a rotation lever connected to the outer guide rail.

* * * * *